Aug. 17, 1937.  W. DAMM  2,090,252
AUTOMATIC TOBACCO WEIGHER
Filed Nov. 7, 1933  2 Sheets-Sheet 1
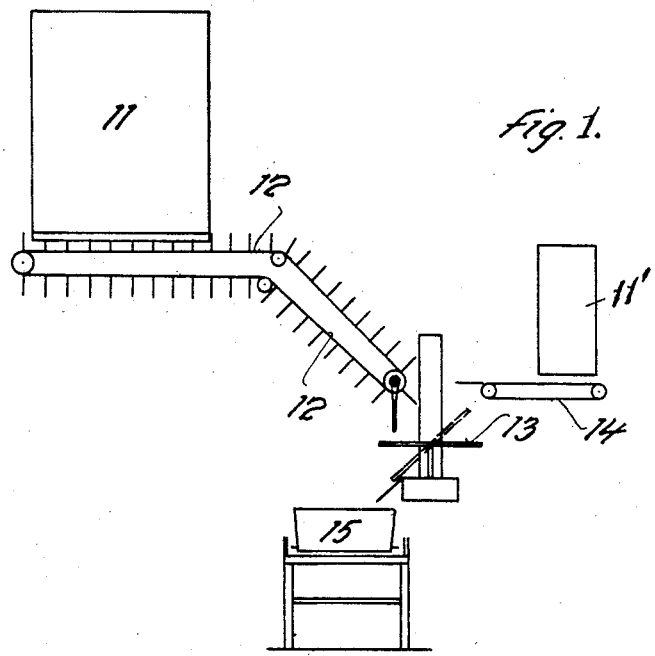
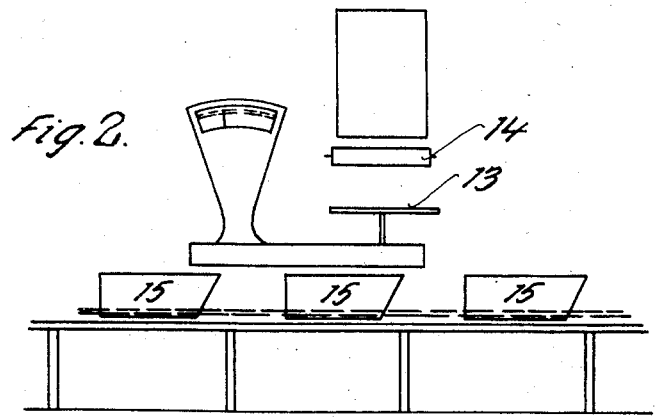
Inventor:
Walter Damm, deceased
by Paula Damm, Executrix
By: Marks & Clerk
Attys.

Aug. 17, 1937. W. DAMM 2,090,252

AUTOMATIC TOBACCO WEIGHER

Filed Nov. 7, 1933 2 Sheets-Sheet 2

Inventor:
Walter Damm, deceased
by Paula Damm, Executrix
by: Glascock Downing & Seebold
Attorney Patented Aug. 17, 1937

2,090,252

UNITED STATES PATENT OFFICE 2,090,252

AUTOMATIC TOBACCO WEIGHER

Walter Damm, deceased, late of Essen-Ruhr, Germany, by Paula Damm, heiress, Essen-Ruhr, Germany Application November 7, 1933, Serial No. 697,072
In Germany June 18, 1930

1 Claim. (Cl. 249—4)

The accurate weighing of tobacco by means of automatic weighers, in which the feeding means are controlled by the movement of the weighing device, presents difficulties both on account of the smallness of the quantities of the material to be weighed off and on account of the fibrous nature of the same. As in weighing machines for other purposes for example in machines for weighing packets of sugar or other substances coarse and fine charging periods have been provided in automatic tobacco weighers, the exact weight being weighed off in the known automatic tobacco weighing machine of this kind by the outlet opening of the feed device leading to the weigher being reduced in size at the end of the weighing operation and by this means a gradually diminishing quantity of the material being conveyed. There is no actual separation of the feed members for the coarse and fine charging, such as is known in the case of weighing devices for other purposes, and the tobacco to be weighed off remains the same during the weighing off operation.

The tobacco weigher forming the subject matter of the present invention also operates with a coarse and a fine charging period, the operation being such that during the coarse charging period the weigher is charged with coarse (long fibre) tobacco and during the fine charging period with fine (short fibre) tobacco. For coarse and fine charging separate feed members are provided so that the coarse and fine charging which follow one another are completely separated from one another. As feed members conveyor belts convey the tobacco on to the same weighing device and are controlled in such a manner that they automatically come into operation one after the other.

This invention will be understood from the following description taken in connection with the drawings, in which:—

Figure 1A:
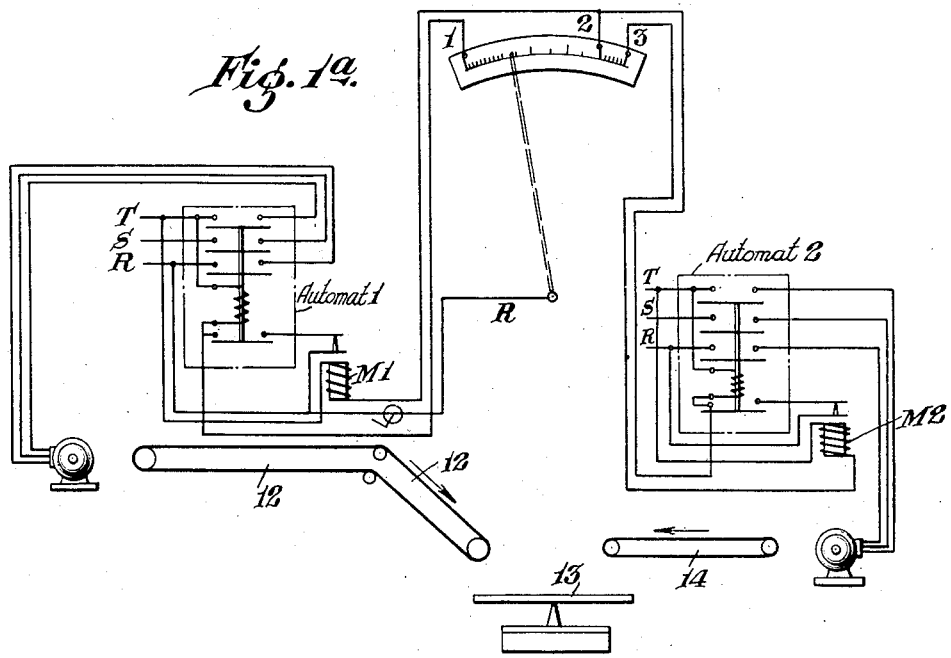
Figures 1B, 1C:
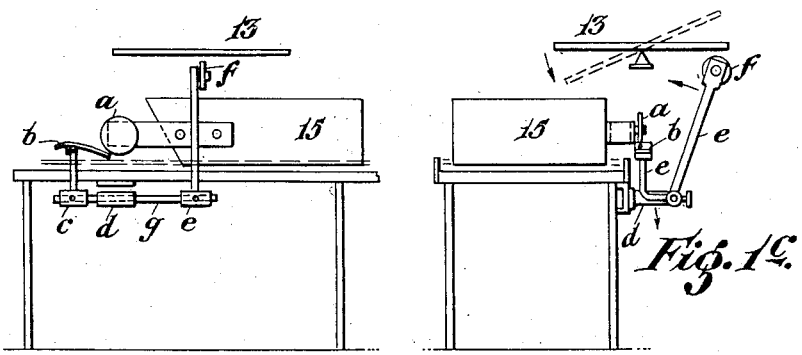
Figure 1D:
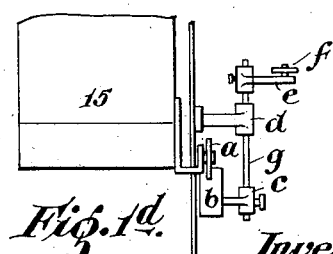

Fig. 1 is a diagrammatic side elevation of one form of the invention; Fig. 1a is a diagrammatic detail view showing particularly the electrical connection for controlling the tobacco feeding belts; Fig. 1b is an elevational detail showing the means for emptying the scale pan; Fig. 1c is a diagrammatic side elevation; Fig. 1d is a similar front elevational view of the arrangement shown in Fig. 1c; and Fig. 2 is a diagrammatic front elevational view of the arrangement shown in Fig. 1.

From the container 11 tobacco is removed by the pronged conveyor belt 12. The tobacco falls on the tilting or swinging scale pan 13. After a certain weight is reached, a contact on the weighing device closes, and the belt 12 is brought to rest. At the same time by a second contact closing, the belt 14 commences to move, which feeds loose or short tobacco. When the correct weight is reached, the belt 14 is brought to rest by a contact on the weighing device closing. When the bucket 15 is under the scale pan the closing of a contact on the bucket causes the locking of the scale pan to be released. The scale pan tilts over and the tobacco falls into the bucket 15. After the bucket has passed, the weighing device is locked again, the pointer returns into the zero position and the contact for the belt 12 is again released.

A container for coarse tobacco is shown at 11 and a container for fine tobacco at 11'. A pronged belt 12 driven by an electric motor receives the coarse tobacco from container 11 and drops it on scale 13. The container for fine tobacco 11' is located on the opposite side of scale 13 and a traveling electrically driven belt 14 receives fine tobacco from the container 11' and drops it on scale 13. Scale 13 is locked from tilting by releasable means. A series of buckets 15 are fed electrically along a path to receive the contents of scale 13 when the same is tilted. Appropriate electrical contacts are provided to perform the following operations: When belt 12 has deposited on the scale 13 nearly 100% of the weight desired the pointer on scale 13 makes a contact stopping belt 12 and starting belt 14. When the total weight is received on scale pan 13 the belt 14 is stopped.

It is important that the bucket 15 be positioned directly below the scale pan, when the scale pan tilts, as otherwise the material might fall between two buckets or simultaneously into two buckets. In order to ensure that the scale pan shall only tilt when a bucket 15 is in correct position, a releasing contact is provided on each bucket, which releases the previous locking of the scale pan and allows it to tilt. After the bucket 15 has passed, the scale pan returns to its normal position and the weighing device is locked again, the pointer returns into the zero position and the contact for the belt 12 is again released and the entire operation is repeated.

The method of control during the operation of applicant's tobacco weigher is not the subject matter of the application; it will be hereinafter distinctly set forth that patent protection is not claimed for this method or system of control which corresponds to the known control means in other automatic weighers.

The control of the tobacco feeding belts "12"

and "14" is effected electrically. The connection is shown in Fig. 1a. There are connected to the motors of the belts automatic devices which effect an automatic closing and breaking of the circuit by means of contacts. The scale of the weighing device is provided with three contacts, 1, 2, 3. When the pointer touches the contacts, the desired connection by means of the automatic devices is effected.

The operation is as follows:

When the scale pan is empty, the pointer is at "0". The contact "1" is in this scale division. When the pointer touches this contact "1", the motor of the belt "12" is connected in circuit and the belt moves. The tobacco conveyed drops onto the scale pan 13. Owing to the increasing load of the scale pan, the pointer ascends and comes closer to the contact "2". The contact "2" may be placed in any desired scale division, for example, 40 g. If the pointer touches the contact "2", the belt "12" will be stopped by the "automatic device 1" and the belt "14" will be simultaneously connected in circuit by the "automatic device 2". The contact "3" is in the scale division which indicates the final weight, for example, 50 g. The pointer ascends further owing to the supply of tobacco by means of belt "14" and finally touches contact "3" whereby the belt "14" is stoped by the "automatic device 2". The final weight is obtained and both belts are stationary. After emptying the scale pan "13" the pointer returns to the "0" scale division and when it touches the contact "1", the belt "12" is again set in motion. The new weighing operation is thereby started.

When the pointer moves back from contact "3" to contact "1", the pointer moves past contact "2" again and the belt "14" would be connected in circuit. However, this is not desired since no contact may take place. By the mechanism of the weighing device, the pointer is slightly raised from the scale but only during the return movement whereby the pointer passes over contact "2" without touching the same. In the "0" scale division, the pointer is again in its original position.

The emptying of the scale pan "13" is shown in Figure 1b. The operation is mechanical.

The bucket 15 receives a roller "a". When passing through the bucket, the roller moves over the pressure plate "b" secured to the bell crank lever "c". The bell crank lever "c" is secured to the shaft "g" rotatably mounted at "d". At the other end, the shaft "g" carries the lever "e" with the roller "f" which is arranged below the scale pan "13".

If the roller "a" moves on the pressure plate "b" the plate "b" will be depressed because the roller is clamped. The lever "e" also rotates with the roller "f". The roller "f" is pressed against the scale pan "13", which is thereby tilted and empties the weighed tobacco in the bucket "15".

Several weighing devices may be operated by varying the position of the roller relative to the buckets.

What is claimed is:

In an automatic tobacco weigher with a coarse and a fine charging period, means for weighing the tobacco, separate conveyor bands, a pronged conveyor band for coarse charging the weighing means, a portion of which towards the delivery end forms a downwardly inclined path, and a conveyor band for fine charging the weighing means, means for charging the pronged conveyor band with coarse (long-fibre) tobacco and means for charging the other conveyor band with fine (short-fibre) tobacco.

PAULA DAMM,
*Heiress of Walter Damm, Deceased.*